Figure 1:
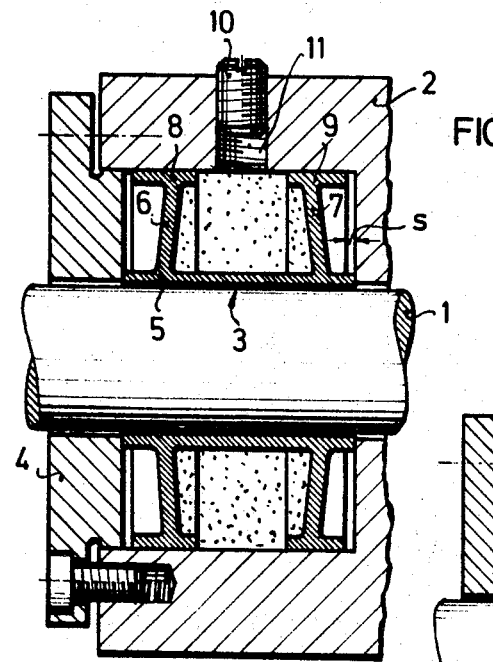

United States Patent

[11] 3,626,506

| [72] | Inventor | Rudolf Spieth |
| | | Kennenburgerstrasse 42, 73 Esslingen-Kennenburg, Germany |
| [21] | Appl. No. | 782,924 |
| [22] | Filed | Dec. 11, 1968 |
| [45] | Patented | Dec. 7, 1971 |
| [32] | Priority | Dec. 15, 1967 |
| [33] | | Germany |
| [31] | | P 16 25 452.7 |

[54] REMOVABLE SECURING DEVICE
6 Claims, 3 Drawing Figs.

[52] U.S. Cl. .................................................. 287/52, 279/2
[51] Int. Cl. ...................................................... F16d 1/06
[50] Field of Search ............................................ 287/52.04, 52, 52.08, 52.09, 126; 279/2, 4; 277/126, 72 FM

[56] References Cited
UNITED STATES PATENTS

| 3,507,507 | 4/1970 | Tobler et al. ................. | 279/2 |
| 2,731,282 | 11/1956 | McManus et al. ............ | 277/72 FM |
| 2,801,858 | 8/1957 | Spieth ......................... | 279/2 |
| 3,025,072 | 3/1962 | Cahill .......................... | 279/4 |
| 3,091,470 | 5/1963 | Anderson et al. ............. | 277/72 FM |
| 3,183,007 | 5/1965 | Tann ........................... | 277/72 FM |

FOREIGN PATENTS

| 56,140 | 6/1952 | France ......................... | 277/126 |
| 869,892 | 3/1953 | Germany ...................... | 287/52 |
| 717,403 | 10/1954 | Great Britain ................. | 279/2 |

*Primary Examiner*—David J. Williamowsky
*Assistant Examiner*—Andrew V. Kundrat
*Attorney*—Werner W. Kleeman ABSTRACT: A clamping bushing for removably securing two elements on each other, for example, a pulley on a shaft, so as to be exactly coaxial. The device consists of a tubular part which is slipped, for example, loosely over the shaft and has a pair of substantially radial flanges which extend at an angle of more or less than a right angle to the tubular part and have small coaxial tubular extensions on their outer ends which are fitted tightly, for example, into a cylindrical bore in a pulley. When a pressure is applied upon a pressure fluid in the chamber formed between the flanges, the tubular part and the wall of the bore, the flanges are bent to a more erect position and thereby increase in effective length so as to connect the two elements tightly to each other.

RUDOLF SPIETH
INVENTOR.

BY Jacobi & Davidson
ATTORNEYS.

REMOVABLE SECURING DEVICE

The present invention relates to a clamping device for removably securing two elements with smooth associated cylindrical surfaces on each other, for example, a pulley on a shaft, which comprises a tubular clamping bushing which may be inserted and clamped between the two main elements and is provided with at least two annular radial webs or flanges which are axially spaced from each other so as to define a chamber into which fluid pressure medium is inserted.

A known clamping device of this type comprises a tubular clamping bushing of a U-shaped cross section the tubular part of which, which is located between and welded to the two annular webs, is deformed by the pressure of the pressure medium in radial directions, especially by bulging at its center, and thereby eliminates the clearance between the two elements at the deformed points where they are clamped together. These clamped points between the clamping bushing and the two elements are then spaced from each other in the axial direction for a distance equal to approximately one-half of the length of the U-shaped part of the clamping bushing. If only a single clamping bushing of such a U-shaped cross section is employed, there is no possibility of preventing the pulley from tilting relative to the shaft. This may be avoided by making the cross-sectional shape of the clamping bushing in the form of two adjacent U's or by providing an additional annular web at the center between the two arms or webs or the single U. There will then be three clamping points axially spaced from each other between the clamping bushing and one of the elements and two clamping points between the clamping bushing and the other element. Although a tilting of one of the elements relative to the other may thus be substantially prevented, there is still the possibility that the two elements will not be mounted exactly coaxial to each other.

It is an object of the present invention to provide a direct clamping connection between the two main elements by means of the annular webs of the clamping bushing which extend in substantially radial directions between these elements so as to insure that these two elements will always be secured exactly coaxial to each other. This object is attained according to the invention by designing each annular web of the bushing so as to be at least partly movable in the axial direction under the action of the pressure medium, to adhere tightly to one of the main elements, and to be shorter in its radial direction when it is in its released position than when it is acted upon by the pressure medium and is in its clamping position. In this clamping position, the annular webs of the clamping bushing therefore extend in substantially radial directions between the two elements and clamp them directly and rigidly together. The tubular part between the annular webs is then employed in the same manner as that of the known clamping bushing to effect an additional clamping action upon the two main elements. Since the annular webs which are axially spaced from each other on a tubular clamping bushing of metal which is designed in accordance with the invention directly connect the two main elements to each other, these elements will be coaxial to each other with the highest possible degree of accuracy and will also remain in such an accurate position even when subjected to great stress.

According to another feature of the invention, the clamping bushing comprises a substantially tubular part to which the inner or outer ends of the annular substantially radial webs are integrally secured at equal distances from its center and at a certain distance from its outer ends. The other end of each of these radial webs carries a short tubular or annular extension which extends at an angle to the web and engages fully and tightly with one of the main elements.

Another feature of the invention provides that the clamping bushing which is substantially U-shaped as seen in a longitudinal section of any sector thereof has an inner or outer peripheral side facing one main element of a greater length in its axial direction than the other peripheral side facing the other element. The difference in length between the two sides of the clamping bushing should preferably be equal in the opposite axial directions from its center, and the length of the shorter side should be adapted to be increased to that of the longer side by the pressure of the pressure medium. Therefore, the inner or outer longer peripheral side of the clamping member engages at all times tightly with one of the main elements, while the shorter side permits the annular webs to be shifted by the pressure medium in the axial direction until this side engages tightly with the other main element.

Figure 2:
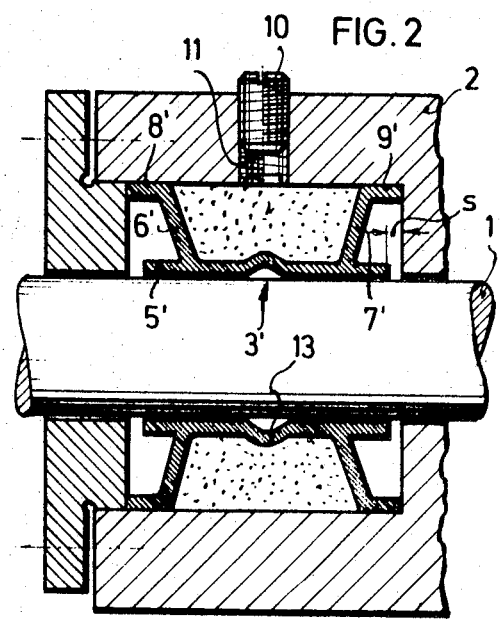
Figure 3:
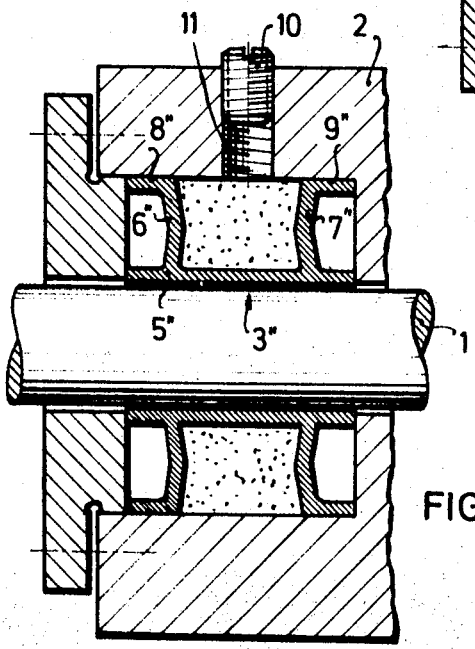

These and other features of the present invention will become further apparent from the following detailed description thereof which is to be read with reference to the accompanying drawings, in which:

FIGS. 1 to 3 show similar diagrammatic longitudinal sections of three different embodiments of the device according to the invention for clamping a pulley to a shaft.

Each of these drawings illustrates a shaft 1 on which, for example, a pulley 2 which is only partly shown is to be secured by means of a clamping bushing 3 which is inserted into a cylindrical bore in pulley 2. The open end of this bore is closed by a cover disk 4 which is removably secured to the pulley 2 by screws.

Each sector of the clamping bushing 3 has a substantially U-shaped longitudinal section and consists of a tubular part 5, the inner diameter of which is normally slightly larger than the diameter of shaft 1 over which it is slipped. According to FIG. 1, the ends of the tubular part 5 are clamped between the cover disk 4 and the bottom of the bore in pulley 2. Spaced from each of its ends, the tubular part 5 has integrally thereon a pair of annular webs or flanges 6 and 7 which together taper conically to the outside from the part 5. On its outer end, each web 6 and 7 carries integrally thereon a shorter tubular or annular part 8 and 9, respectively, the outer peripheral surface of which engages fully with the peripheral surface of the bore in pulley 2, while the outer ends of the annular parts 8 and 9 are spaced at a distance S from the bottom of the bore in pulley 2 and from the inner end of the cover disk 4. These annular parts 8 nd 9 prevent the webs 6 and 7 of the clamping bushing 3 from digging into the wall of the bore and also function as additional sealing means for the shaft.

The chamber which is defined by the tubular part 5, the two annular webs 6 and 7, and a part of the wall of the bore in the pulley 2 is connected to the outside by a tapped radial bore 11 which is adapted to be tightly closed by a screw 10 and through which a pressure medium, preferably a liquid or plastic, is inserted into this chamber. When screw 10 is tightened, a pressure will be exerted upon the pressure medium in the chamber between the webs 6 and 7 with the result that the central section of the tubular part 5 will be pressed in the direction toward the shaft 1 and the two annular webs 6 and 7 will be bent in opposite outward directions. These webs 6 and 7 are thereby erected to a position substantially vertical to shaft 1 and eliminate the distance S and thus act similar to plate springs under pressure and thereby exert a pressure through the annular parts 8 and 9 upon the pulley 2 and through the annular parts of the tubular part 5 upon the shaft 1. In other words, the two elements 1 and 2 are thus clamped tightly together. The annular webs 6 and 7 then form a substantially radial and rigid connection between shaft 1 and pulley 2. The clearance which previously existed between these elements is thus eliminated completely and both of them are rigidly supported on and secured to each other.

The second embodiment of the invention as illustrated in FIG. 2 differs from the embodiment according to FIG. 1 in that the webs 6' and 7' of the clamping bushing 3 which when not under pressure are of a conical shape taper in the opposite direction, namely, in the direction toward the shaft 1 so that the outer annular parts 8' and 9' are spaced at a greater distance from each other than the two ends of the inner tubular part 5' which is additionally provided with a central outwardly projecting corrugation 13. When a pressure is exerted by the screw 10 upon the pressure medium which is enclosed in the chamber which is defined by the clamping sleeve 3' and a part of the wall of the recess in the annular disk 2, the annular webs 6' and 7' are erected, whereby the two ends of the tubular part 5' are shifted in the axial direction away from each other and the webs 6' and 7' again form a rigid connection between the annular disk 2 and the shaft 1. The corrugation 13 is then also partly or entirely eliminated.

According to the third embodiment of the invention, as illustrated in FIG. 3, the corresponding outer ends of the tubular part 5'' and of the annular parts 8'' and 9'' of the clamping bushing are disposed within the same planes. The annular webs 6'' and 7'', however, are of an angular shape, tapering from their inner and outer ends toward their centers. When a pressure is applied by screw 10 upon the pressure medium in the chamber which is defined by the clamping bushing 3'' and a part of the wall of the recess in the pulley 2, the angular webs 6'' and 7'' are straightened out and their radial length is thereby increased so that the tubular parts 5'', 8'', and 9'' are pressed tightly against the shaft 1 and the wall of the recess in pulley 2 and the two elements 1 and 2 are rigidly connected to each other.

The clamping bushing 3 may also be made of a shape inverse to that as shown in either of FIGS. 1 to 3, so that the tubular part 5 is integral with the outer ends and the annular parts 8 and 9 are integral with the inner ends of the annular webs 6 and 7 and the parts 8 and 9 engage, for example, upon the shaft 1.

It is also possible to make the annular webs 6 and 7 of a rectangular cross section so as to extend parallel to each other. In this event, the length of the diagonal of the rectangle together with that of the extension thereof within the tubular part 5 must be greater than the greatest distance between the two elements 1 and 2 which are to be connected to each other, and the annular webs and/or the tubular part which may form the inner or outer side of the clamping bushing must permit the annular webs 6 and 7 to tilt so that under the action of the pressure medium these webs will clamp against the two elements 1 and 2 and thus rigidly connect them in radial directions to each other.

It is further possible to provide two or more clamping bushings in the axial direction behind each other in which event each of these elements is provided with tapered bore 11 for a screw 10. A clamping bushing may also be of a shape similar to two or more axially adjacent bushings, the abutting parts of which are connected to each other.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. A clamping bushing adapted to be inserted between an outer cylindrical surface of one element and an inner cylindrical surface of another element for fixedly securing both of said elements which otherwise are mutually displaceable, said clamping bushing comprising:
   a. at least two substantially annular, partially movable walls having a respective outer and inner end and extending essentially radially between both of said elements and spaced in axial direction from one another in order to form at least part of a chamber;
   b. a substantially tubular member for interconnecting both of said walls with one another, one of said ends of each of said annular walls being connected with said tubular member, said tubular member forming a further wall of said chamber, the opposite ends of both of said annular walls bearing flushly against the respective inner and outer cylindrical surfaces of their neighboring element;
   c. at least one respective annular-shaped part secured at one side with each of both said annular walls, the oppositely directed outer ends of both of said annular-shaped parts determining the axial length of said clamping bushing;
   d. a pressure medium for filling said chamber, means defining a connecting channel communicating with said chamber and provided in the element spaced from said tubular member, screw means for closing said connecting channel;
   e. said annular walls extending at an angle from said tubular member such that they are shorter in radial direction than the intermediate space between said elements to be connected together when said chamber is not under pressure, and when said chamber is under pressure said annular walls being bent such that they become longer in radial direction such that said inner and outer ends of said annular walls are tightly pressed against said elements to fixedly clampingly retain said elements in fixed relationship to one another, one said end of each of said annular walls is secured to said tubular member at equal distances from its center, said at least one respective annular-shaped part comprising a short annular part secured to the other end of each of said annular walls and being substantially parallel to said tubular member and having a peripheral surface fully engaging with the inner cylindrical surface of the other element at least when said pressure is applied in said chamber; and
   f. further comprising short extensions of said tubular member having an equal length from said annular walls, the distance between the ends of said extensions being shorter than the distance between the ends of said short annular parts when said chamber is not under pressure.

2. A clamping bushing adapted to be inserted between an outer cylindrical surface of one element and an inner cylindrical surface of another element for fixedly securing both of said elements which otherwise are mutually displaceable, said clamping bushing comprising:
   a. at least two substantially annular, partially movable walls having a respective outer and inner end and extending essentially radially between both of said elements and spaced in axial direction from one another in order to form at least part of a chamber;
   b. a substantially tubular member for interconnecting both of said walls with one another, one of said ends of each of said annular walls being connected with said tubular member, said tubular member forming a further wall of said chamber, the opposite ends of both of said annular walls bearing flushly against the respective inner and outer cylindrical surfaces of their neighboring element;
   c. at least one respective annular-shaped part secured at one side with each of both said annular walls, the oppositely directed outer ends of both of said annular-shaped parts determining the axial length of said clamping bushing;
   d. a pressure medium for filling said chamber, means defining a connecting channel communicating with said chamber and provided in the element spaced from said tubular member, screw means for closing said connecting channel;
   e. said annular walls extending at an angle from said tubular member such that they are shorter in radial direction than the intermediate space between said elements to be connected together when said chamber is not under pressure, and when said chamber is under pressure said annular walls being bent such that they become longer in radial direction such that said inner and outer ends of said annular walls are tightly pressed against said elements to fixedly clampingly retain said elements in fixed relationship to one another, one said end of each of said annular walls is secured to said tubular member at equal distances from its center, said at least one respective annular-shaped part comprising a short annular part secured to the other end of each of said annular walls and being substantially parallel to said tubular member and having a peripheral surface fully engaging with the inner cylindrical surface of the other element at least when said pressure is applied in said chamber;
   f. in which any sector of said bushing formed by said annular walls and said tubular member is substantially U-shaped in its axial direction, the peripheral side of said bushing facing one of said elements having a greater length in the axial direction than the peripheral side facing the other element when said chamber is not under pressure, the shorter peripheral side being increased in length when said chamber is under pressure; and g. in which at least when said chamber is not under pressure, said tubular member facing one of said elements has a least one resilient corrugation projecting into said chamber in the direction toward the other element and adapted to be depressed so as to extend the length of said tubular member when a pressure is applied in said chamber.

3. A clamping bushing adapted to be inserted between an outer cylindrical surface of one element and an inner cylindrical surface of another element for removably securing said elements to each other, said bushing comprising at least two annular deformable walls extending substantially radially between said two elements and spaced in the axial direction from each other so as to form the outer walls of a chamber, means for connecting said annular walls to each other, a pressure medium filling said chamber, means for exerting a pressure upon said pressure medium, said annular walls having a shape so as to have a shorter length as seen in the radial direction of said elements when no pressure is applied upon said pressure medium and being adapted to be deformed when a pressure is exerted in said chamber so as to have a greater radial length so that the inner and outer ends of said annular walls will then engage tightly upon said elements and clamp the same rigidly to each other, said connecting means comprising a substantially tubular part forming another wall defining said chamber and adapted to engage substantially along its entire length with one of said elements at least when said pressure is applied in said chamber, one end of each of said annular walls being secured to said tubular part at equal distances from its center, a short annular part secured to the other end of each of said annular walls and being substantially parallel to said tubular part and having the peripheral surface fully engaging with the other element at least when said pressure is applied in said chamber, said tubular part including short extensions having an equal length from said annular walls, the distance between the ends of said extensions being shorter than the distance between the ends of said short annular parts when said chamber is not under pressure.

4. A clamping bushing adapted to be inserted between an outer cylindrical surface of one element and an inner cylindrical surface of another element for removably securing said elements to each other, said bushing comprising at least two annular deformable walls extending substantially radially between said two elements and spaced in the axial direction from each other so as to form the outer walls of a chamber, means for connecting said annular walls to each other a pressure medium filling said chamber, means for exerting a pressure upon said pressure medium, said annular walls having a shape so as to have a shorter length as seen in the radial direction of said elements when no pressure is applied upon said pressure medium and being adapted to be deformed when a pressure is exerted in said chamber so as to have a greater radial length so that the inner and outer ends of said annular walls will then engage tightly upon said elements and clamp the same rigidly to each other, said connecting means comprising a substantially tubular part forming another wall defining said chamber and adapted to engage substantially along its entire length with one of said elements at least when said pressure is applied in said chamber, one end of each of said annular walls being secured to said tubular part at equal distances from its center, and a short annular part secured to the other end of each of said annular walls and being substantially parallel to said tubular part and having a peripheral surface fully engaging with the other element at least when said pressure is applied in said chamber, any sector of said bushing formed by said annular walls and said tubular part being substantially U-shaped in its axial direction, the peripheral side of said bushing facing one of said elements having a greater length in the axial direction than the peripheral side facing the other element when said chamber is not under pressure, the shorter peripheral side being increased in length when said chamber is under pressure, and at least when said chamber is not under pressure, a part of said annular walls are equally inclined at a small angle relative to each other, and at least when said chamber is not under pressure, said tubular part facing one of said elements has at least one resilient corrugation projecting into said chamber in the direction toward the other element and adapted to be depressed so as to extend the length of said tubular part when a pressure is applied in said chamber.

5. A clamping bushing adapted to be inserted between an outer cylindrical surface of one element and an inner cylindrical surface of another element for removably securing said elements to each other, said bushing comprising at least two annular deformable walls extending substantially radially between said two elements and spaced in the axial direction from each other so as to form the outer walls of a chamber, means for connecting said annular walls to each other, a pressure medium filling said chamber, means for exerting a pressure upon said pressure medium, said annular walls having a shape so as to have a shorter length as seen in the radial direction of said elements when no pressure is applied upon said pressure medium and being adapted to be deformed when a pressure is exerted in said chamber so as to have a greater radial length so that the inner and outer ends of said annular walls will then engage tightly upon said elements and clamp the same rigidly to each other, said connecting means comprising a substantially tubular part forming another wall defining said chamber and adapted to engage substantially along its entire length with one of said elements at least when said pressure is applied in said chamber, one end of each of said annular walls being secured to said tubular part at equal distances from its center, a short annular part secured to the other end of each of said annular walls and being substantially parallel to said tubular part and having a peripheral surface fully engaging with the other element at least when said pressure is applied in said chamber, said tubular part including short extensions having an equal length from said annular walls, the distance between the outer ends of said annular parts being substantially equal to the distance between the outer ends of said extensions of said tubular part, said annular walls having central parts spaced from each other at a smaller distance than the parts thereof adjacent to said annular parts and said extensions.

6. A clamping bushing adapted to be inserted between an outer cylindrical surface of one element and an inner cylindrical surface of another element for fixedly securing both of said elements which otherwise are mutually displaceable, said clamping bushing comprising:

a. at least two substantially annular, partially movable walls having a respective outer and inner end and extending essentially radially between both of said elements and spaced in axial direction from one another in order to form at least part of a chamber;

b. a substantially tubular member for interconnecting both of said walls with one another, one of said ends of each of said annular walls being connected with said tubular member, said tubular member forming a further wall of said chamber, the opposite ends of both of said annular walls bearing flushly against the respective inner and outer cylindrical surfaces of their neighboring element;

c. at least one respective annular-shaped part secured at one side with each of both said annular walls, the oppositely directed outer ends of both of said annular-shaped parts determining the axial length of said clamping bushing;

d. a pressure medium for filling said chamber, means defining a connecting channel communicating with said chamber and provided in the element spaced from said tubular member, screw means for closing said connecting channel;

e. said annular walls extending at an angle from said tubular member such that they are shorter in radial direction than the intermediate space between said elements to be connected together when said chamber is not under pressure, and when said chamber is under pressure said annular walls being bent such that they become longer in radial direction such that said inner and outer ends of said annular walls are tightly pressed against said elements to fixedly clampingly retain said elements in fixed relationship to one another, one said end of each of said annular walls is secured to said tubular member at equal distances from its center, said at least one respective annular-shaped part comprising a short annular part secured to the other end of each of said annular walls and being substantially parallel to said tubular member and having a peripheral surface fully engaging with the inner cylindrical surface of the other element at least when said pressure is applied in said chamber; and f. wherein said annular walls have thin central portions spaced from each other at a smaller distance than the end portions thereof adjacent to said short annular parts.

* * * * *